US008169401B2

(12) United States Patent
Hardwick

(10) Patent No.: US 8,169,401 B2
(45) Date of Patent: May 1, 2012

(54) HAPTIC INTERFACE

(75) Inventor: Andrew J Hardwick, Ipswich (GB)

(73) Assignee: British Telecommunications public limited company, London (GB)

(*) Notice: Subject to any disclaimer, the term of this patent is extended or adjusted under 35 U.S.C. 154(b) by 1385 days.

(21) Appl. No.: 10/482,730

(22) PCT Filed: Jul. 5, 2002

(86) PCT No.: PCT/GB02/03128
§ 371 (c)(1),
(2), (4) Date: Jan. 5, 2004

(87) PCT Pub. No.: WO03/007136
PCT Pub. Date: Jan. 23, 2003

(65) Prior Publication Data
US 2004/0169483 A1    Sep. 2, 2004

(30) Foreign Application Priority Data
Jul. 10, 2001   (EP) .................................... 01305947

(51) Int. Cl.
*G09G 5/00* (2006.01)
(52) U.S. Cl. ................... 345/156; 702/85; 340/407.1
(58) Field of Classification Search .................. 345/156, 345/173–178; 702/41–44, 85; 178/18.01; 340/407.1, 4.12; 463/30; 434/114
See application file for complete search history.

(56) References Cited

U.S. PATENT DOCUMENTS

| | | | |
|---|---|---|---|
| 5,574,830 A | 11/1996 | Quzilleau | |
| 5,709,219 A | 1/1998 | Chen et al. | |
| 5,888,213 A | 3/1999 | Sears et al. | |
| 5,959,613 A | 9/1999 | Rosenberg et al. | |
| 6,088,019 A | 7/2000 | Rosenberg | |
| 6,101,530 A | 8/2000 | Rosenberg et al. | |
| 6,125,385 A | 9/2000 | Wies et al. | |
| 6,144,884 A | 11/2000 | Niemeyer et al. | |
| 6,353,850 B1 * | 3/2002 | Wies et al. | 709/203 |
| 6,366,272 B1 | 4/2002 | Rosenberg et al. | |
| 7,098,888 B2 * | 8/2006 | Temkin et al. | 345/156 |

(Continued)

FOREIGN PATENT DOCUMENTS

| | | |
|---|---|---|
| DE | 19624402 A1 | 1/1998 |
| WO | WO 01/33760 A2 | 5/2001 |

OTHER PUBLICATIONS

Paul Penn, Helen Petrie, Chetz Colwell, Diana Kornbrot, Stephen Furner, Andrew Hardwick: "The Haptic Perception of Texture in Virtual Environments: An Investigation With Two Devices." Haptic Human-Computer Interaction 2000: p. 25-30.*

(Continued)

*Primary Examiner* — Stephen Sherman
(74) *Attorney, Agent, or Firm* — Nixon & Vanderhye P.C.

(57) ABSTRACT

Simulated textures whose parameters are held with object model data in a data store are modified in accordance with data held in data store which data defines a Gamma correction factor previously determined for each identified user. The gamma correction factor is determined by outputting to a Haptic Output interface a texture simulation including spaced grooves or ridges. By correlating user response to the perceived "feel" of the texture (rough, medium or smooth scale for example) the user's perceptual factors can be determined. Subsequently applying the perceptual factors to effect a mathematical adjustment (power) of texture in simulation algorithms allows output simulations to be adapted so that each user has a corresponding perception of the simulated objects.

13 Claims, 5 Drawing Sheets

U.S. PATENT DOCUMENTS

2002/0054019 A1     5/2002    Rosenberg et al.
2002/0082724 A1     6/2002    Hennion

OTHER PUBLICATIONS

International Search Report—Aug. 29, 2003.
Buttolo et al., "Architectures for Shared Haptic Virtual Environments", Computers and Graphics, Pergamon Press Ltd. Oxford, GB., vol. 21, No. 4, Jul. 8, 1997, pp. 421-429, XP004096045.
Hardwick et al., "Tactile Display of Virtual Reality from the World Wide Web—a potential access method for blind people", Displays, Elsevier Science Publishers BV., Barking GB., vol. 80, No. 3, May 15, 1998, pp. 153-161.
International Search Report—Dec. 16, 2002.
International Search Report—Jan. 10, 2003.
Stevens et al., "The Scaling of Subjective Roughness and Smoothness," Journal of Experimental Psychology (1962), vol. 64, No. 5, pp. 489-494.
Lederman, Susan J., "Tactile Roughness of Grooved Surfaces: The Touching Process and Effects of Macro- and Microsurface Structure," Perception & Psychophysics (1974), vol. 16 (2), pp. 385-395.
Office Action (6 pgs.) dated Apr. 22, 2010 issued in corresponding Canadian Application No. 2,450,357.

* cited by examiner

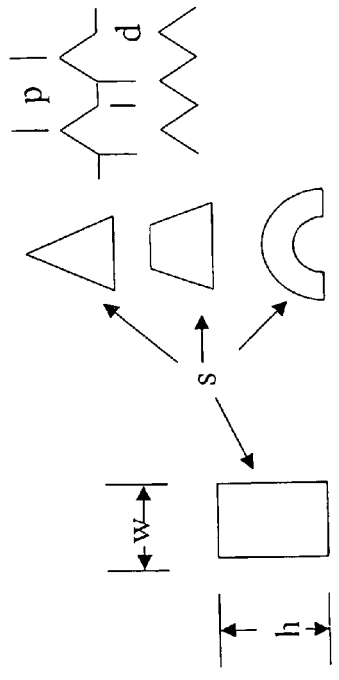
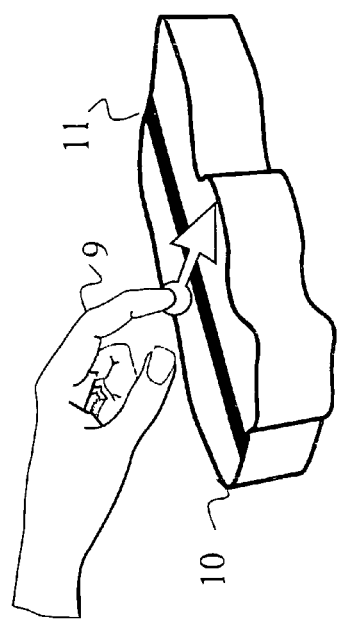
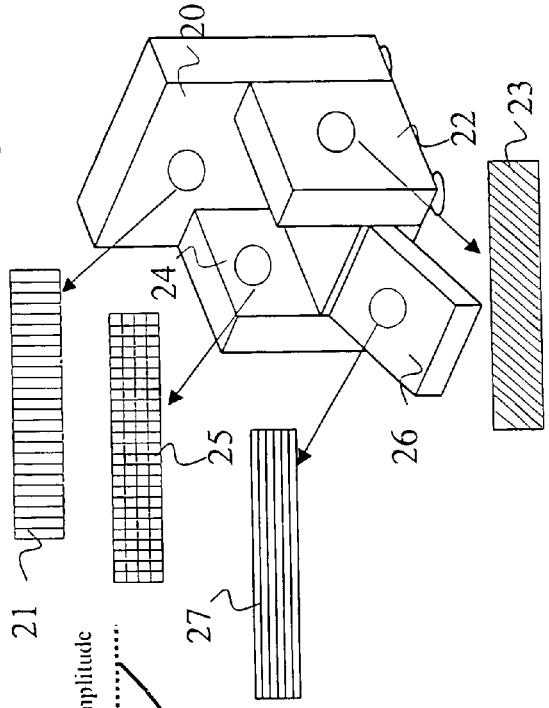
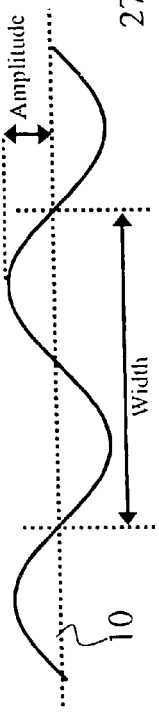
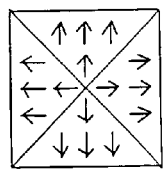
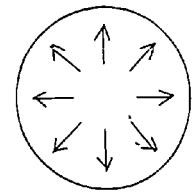

HAPTIC INTERFACE

This application is the US national phase of international application PCT/GB02/003128 filed 5 Jul. 2002 which designated the U.S. and claims benefit of EP 01305947.2, dated Jul. 10, 2001, the entire content of which is hereby incorporated by reference.

BACKGROUND

1. Technical Field

The present invention relates to a haptic interface and more particularly, but not exclusively, to a method of adjusting such a device to suit individual users.

2. Related Art

After sight and sound, the sense of touch is becoming the third element of multimedia output. The sense of touch is particularly useful to persons with visual impairment and also in training some mentally handicapped people. In order to provide touch stimulation, particularly where electrical signals are used to cause a remote interface to operate, it is preferable and usually beneficial to ensure that the output is perceived by each user in the same way and/or as at the same level.

In the Journal of Experimental Psychology, 64, pp 489-494, S. S. Stevens and J. R. Harris, "The Scaling of Subjective Roughness and Smoothness", there is discussed the manner in which people perceive roughness or smoothness in a subjective comparative manner. Stevens determined that the perception of roughness is proportional to grit size of sandpaper raised to some power. Later studies by S. J. Lederman, for example (Perception and Psychophysics 16(2) pp 385-395 "Tactile Roughness of Grooved Surfaces; The touching process and effects of macro- and micro-surface Structure"), confirmed that such perception also applied to grooves and bumps.

Now, while each person has a constant perception of comparative roughness or smoothness, there is a variation in which different persons perceive such roughness. So that although "Steven's Law" applies across substantially the whole populace, the variation in perception between persons alters the power to which grit size needs to be raised. This so-called Steven's exponent, once determined for an individual in respect to a surface type, is constant whether the surface texture is grit, groove or bump. Thus it is known that Steven's exponent is constant for different grits, for different grooves and different bumps separately but the exponent will often vary between these, although it is possible to convert the exponent as needed.

Now, in seeking to improve communication between people, particularly for example to provide additional stimulation, in addition to visual or aural stimulation, the provision of haptic information in signalling transmitted across the #STN for example or as an output from a control means requires some form of calibration between users or with an end user.

BRIEF SUMMARY

According to an exemplary embodiment of the present invention there is provided a method of calibrating a haptic interface comprising the steps of outputting to a touchable device a signal to cause simulation of a first pattern, determining from user response an index number for the first pattern, outputting to said touchable device at least one further signal causing simulation of at least one further pattern and determining from user response a respective index number for each such further pattern to provide a set of user-specific index numbers, and comparing the set of index numbers with a predetermined set of known index numbers representing a base exponent value to determine a mathematical parameter set defining user-specific correction factors to be applied to haptic signaling outputs.

The method preferably comprises outputting a series of signals defining grooves of varying width and measuring the user response thereto to determine the user specific correction factors which may be the Stevens exponent for the user.

Using the method outlined above it is possible to adjust subsequent output of a computer system by application of the determined user-specific correction factors or Steven's exponent to pre-determined haptic output signals.

Thus according to a feature of the present invention there is provided a method of outputting control signals to a haptic output interface comprising the steps of storing data defining signals to be output to cause the haptic output interface to simulate a display, recovering said data in response to user input, modifying the data by application of a determined user-specific correction factors and outputting signals determined by the modified data to cause the haptic output interface to provide a user-specific display so that perception of the display between user's having differing correction factors is substantially similar.

The method may be implemented using apparatus comprising processing means and signal output means coupled to a haptics output interface, the processing means storing data defining a multiplicity of display effects, the processing means being arranged to cause output of a series of signals defining known textures to the haptic output interface and to record users' reactions to said outputs, the processor determining from said users' respective reactions to said outputs a correction factor to be used with each of said stored display effects to allow the effects when displayed to be perceived as substantially similar to a known perception of the effects.

Correction factors in respect of a plurality of users may be stored in the processing means whereby on subsequent usage of the apparatus input of a user identity may be used so that a user may return to the apparatus without requiring re-calibration.

Correction factors or Steven's exponent values determined by a first apparatus may be stored at the apparatus and/or may be transmitted to other locations whereby a known gamma correction factor (the power to which the physical parameter defining the scale of surface fluctuations should be raised to perform the compensation so-named by analogy to video monitor colour correction) for a particular user may be shared by multiple apparatuses. The gamma correction factor may be used for example at a central processor connected by way of a connection oriented or connectionless network to a haptics output interface at a remote location, for example by way of an internet connection to a games output device.

Where a plurality of users are interacting simultaneously with processing means by way of respective interfaces their respective correction factors or Steven's exponent factors may be used so that each user has a substantially similar perception of the haptics output.

BRIEF DESCRIPTION OF THE DRAWINGS

A method and apparatus in accordance with the invention will now be described by way of example only with reference to the accompanying drawings of which:

FIG. 6 shows schematically some haptic effects and simulatable shapes used in the invention;

FIG. 7 shows a simulatable article;

FIG. 8 shows a sinusoidal wave diagram;

FIGS. 9 and 10 show forces exerted in respect of some shapes;

FIG. 11 shows a shape which might be simulated; and

DETAILED DESCRIPTION OF EXEMPLARY EMBODIMENTS

Figure 1:
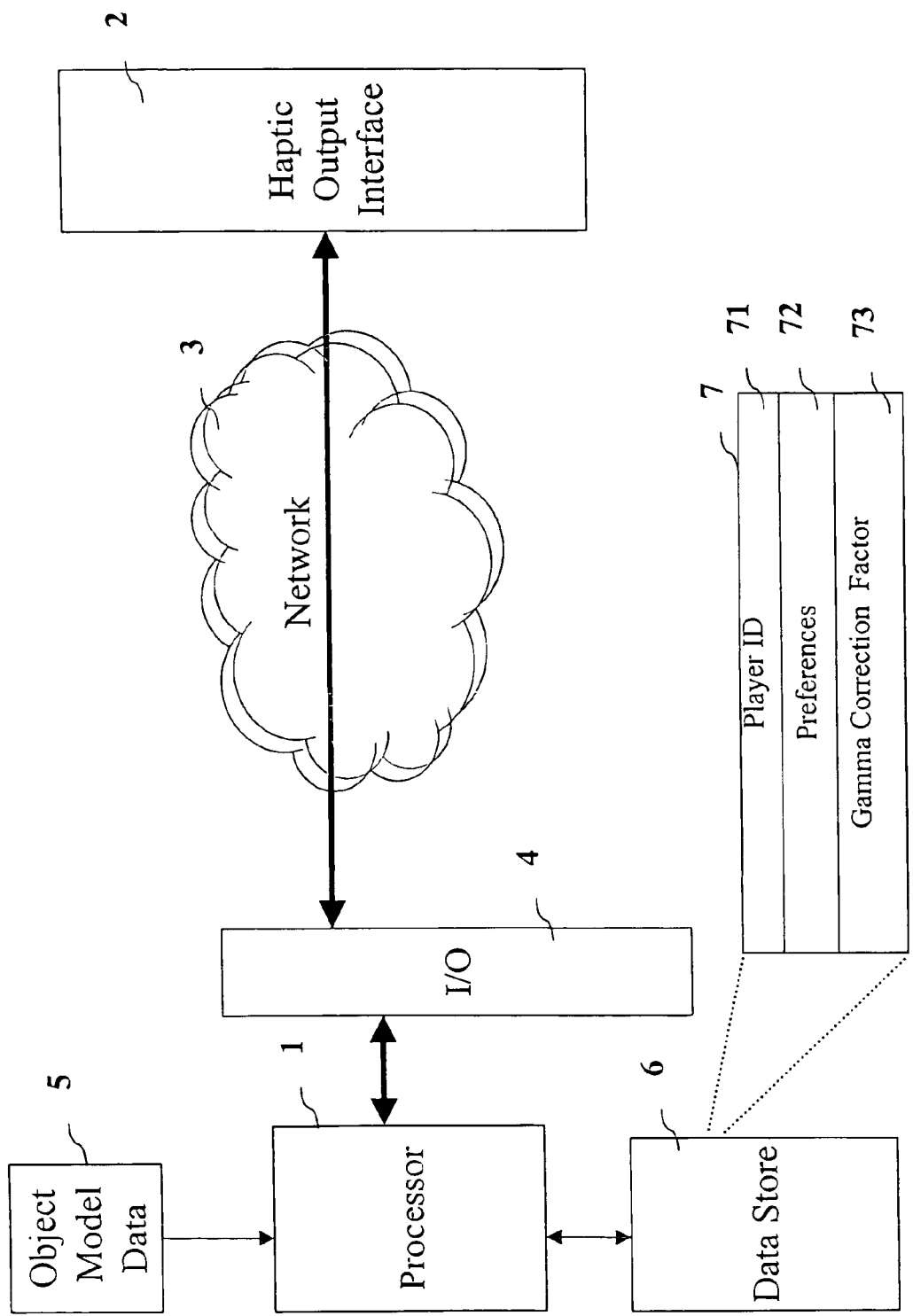
FIG. 1 is a block schematic diagram of apparatus suitable for implementing the invention.

Referring first to FIG. 1, the haptic interface control runs in a processor 1, for example in a network service platform of the PSTN or on a home computer or gaming device. In the present case it is assumed that the processor communicates with a Haptic output interface 2 remotely by way of a network 3 and an appropriate processor to network interface. It will however be appreciated that a direct connection via any appropriate interface to the haptic output interface 2 can be used.

The network 3 may be the Public Switched Telephone Network (PSTN), the world wide web ("Internet") so-called Intranets or other internal networks including for example low power home communications radio links such as "Bluetooth" (Trademark).

The processor 1 has associated object model data storage 5 or access to a data warehouse for example, in which is stored data defining objects which may be simulated at the haptic output interface 2. Typical objects which might be simulated at the haptic output interface include basic shapes having textures and other properties such as hardness, flexibility and the like an exemplar of which is described hereinafter.

Also provided is a data store 6 used to store certain preferences associated with a particular user identified by, for example, interne address, Calling Line Identity (CLI) or personal identification number (PIN). Thus as shown by the data block 7, the minimum of data held will include the player ID (71) and the derived gamma correction factor (73) determined by an exemplary method of the invention. Other preferences (72) relating to the customer ID such as a preferred starting point within the object models available (which might include text simulation models) can also be stored in the same data store for use by the processor 1.

There are many examples of haptic output devices which have the capability of exerting a force back to a user and of detecting force applied by the user and the position of the user's operating function. In the present specific description the "PHANToM 1.0" haptic output device available from "SensAble Technologies, Inc." (15 Constitution Way, Woburn, Mass., USA, http://www.sensable.com). A sketch of a PHANToM Haptic output device is shown in FIG. 2 (from PHANtoM sales literature) to which reference is now made.

Figure 2:
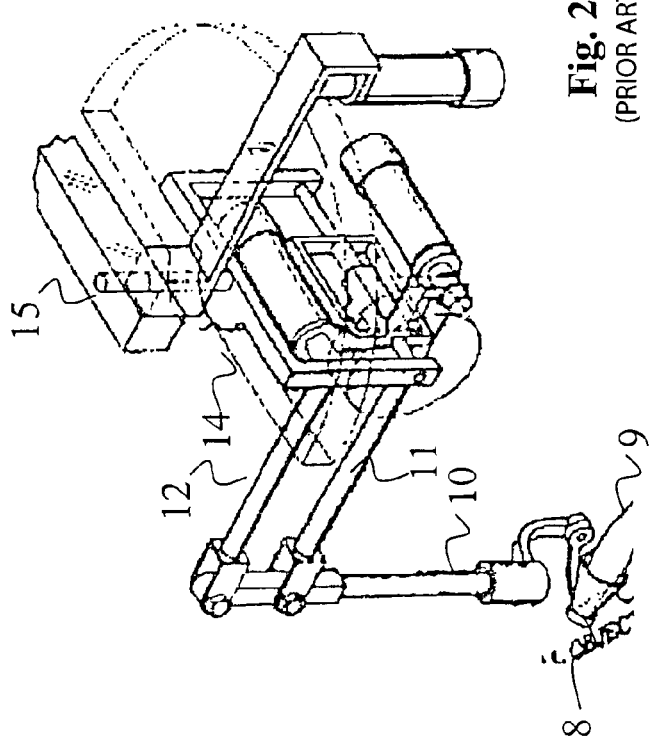
FIG. 2 is a schematic diagram of a known haptic input/output device.

The device in FIG. 2 has an interchangeable user contact in the form of a thimble 8 or a stylus (not shown) connected to an arm 10 which has three degrees of freedom (left/right tip ("X"), in/out ("Y") and up/down ("Z")). It will be appreciated that more sophisticated devices having additional degrees of freedom could be calibrated and controlled by the exemplary method hereinafter described. However, to simplify description and to facilitate understanding of this exemplary embodiment of the invention it is only necessary to consider the X,Y,Z co-ordinates which permits three dimensional objects to be simulated. The PHANToM has a motor driver and sensor for each of the X, Y and Z axes whereby force can be exerted to the user contact 8 and the position of the user's finger 9 can be sensed. Thus, if the user moves finger 9 vertically (Z) with respect to his present position, the movement is sensed by the angular displacement of levers 11 and 12 pivotally about the mounting frame. Similarly, a motor attached to levers 11 and 12 may exert force in the Z direction.

Additionally, moving the finger 9 in the Y direction causes pivotal movement of lever 14 with respect to the frame because of the differential displacement of levers 11, 12 with respect to each other acting on the vertical arm of lever 14. Again by applying a motor force on lever 14 enables force simulation in the Y direction Finally, movement in the horizontal plane causes the assembly to move about the pivot 15 which can be appropriately sensed as movement on the X axis and motor action to exert force against the pivotal motion may be applied appropriately. The device of FIG. 2 while being referred to within the following text is a known device such that further constructional detail is not deemed necessary in the context of the present description. It will be appreciated that the haptic output device can be obtained from the manufacturer with appropriate description to enable the user to provide signalling for the motor action and to receive signalling in respect of position location.

Thus as used herein a force exerted in the X direction indicates an appropriate electrical signal being transmitted to the motor controlling movement on the X-axis in response to a sensed position of a user's finger in the X direction. Continuous sensing of the X-direction location enables the processor to determine the amount of power to be applied—stable, increasing or decreasing—to the X axis motor to effect simulation of the contour map in the X direction at the appropriate Y,Z locations.

Similarly, a force exerted in the Y direction indicates an appropriate electrical signal being transmitted to the motor controlling movement on the Y-axis in response to a sensed position of a user's finger in the Y direction. Continuous sensing of the Y-direction location enables the processor to determine the amount of power to be applied—stable, increasing or decreasing—to the Y axis motor to effect simulation of the contour map in the Y direction at the appropriate X and Z locations.

Also, for the avoidance of doubt, a force exerted in the Z direction indicates an appropriate electrical signal being transmitted to the motor controlling movement on the Z-axis in response to a sensed position of a user's finger in the Z direction. Continuous sensing of the Z-direction location enables the processor to determine the amount of power to be applied—stable, increasing or decreasing—to the Z axis motor to effect simulation of the contour map in the Z direction at the appropriate X and Y locations.

It will be appreciated that continuous adaptation of the forces on the X, Y and Z motors will be required in a correlated manner since the various movements of the user's finger 9 will result in sensed changes in all three directions.

Thus, by effecting force in each of the directions, simulation of the effect of three dimensional objects can be obtained. For example if a "vertical" wall is present then a strong force will be felt in the X direction preventing movement of the finger through the wall from its nominal base position to its top. Thus the user is encouraged to track vertically (Z) effectively in free space and may seek to travel in the Y direction to determine the location of the back or front ends of such a wall.

Tracking in the Y direction the user may encounter a "corner" comprising a high force in both X and Y directions so that the user can either track back along the X or Y directions in search of other avenues of "escape" or can seek to move in the Z direction. If the simulation is in effect a "room" then tracking in the Z direction enables the user to locate the "ceiling".

Other effects can be simulated. Thus if a simulated foam barrier is present for example moving in to the foam in the X direction for example will encounter a gradually increasing X-motor resistance, possibly varying to reflect the "bounce" back from the resilience of the foam. Such simulations are known and are only discussed here to facilitate an understanding of the underlying technology to which the invention is applied.

Figure 3:
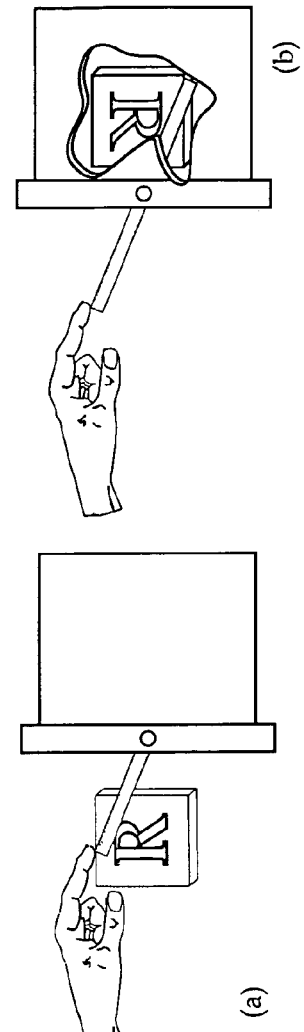
FIG. 3 is a schematic diagram showing haptic searching arrangements.

Referring briefly to FIG. 3, taken from a dissertation submitted to the University of London by Andrew Hardwick, ("Haptic Simulation for Psychophysical Investigations"), it was found that using a haptic device to simulate the presence of a cube resulted in differing perceptions of where the front, sides and back, top and bottom of the cube were in relation to the user's finger. This appears to arise because some people consider that the simulated object is what they are "touching" (direct contact, FIG. 3(a)) while others considered the object to be away from them such that they were "feeling" the object using a probe at a distance (indirect contact, FIG. 3(b)). This effect, while having no adverse effects on perception may need to be taken in to account when determining user preferences for orientation of object simulations being presented to the user.

Figure 4:
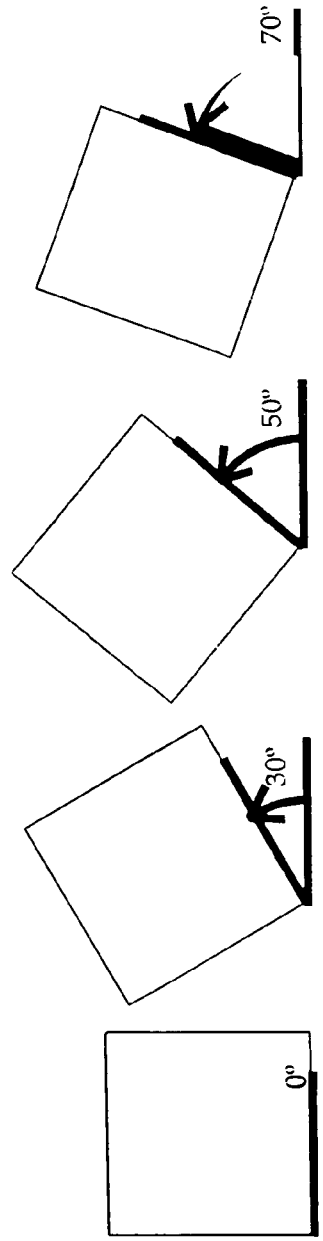
FIG. 4 is a schematic diagram of a block in various positions.

Referring to FIG. 4, also taken from the Hardwick Dissertation referenced above, shows that the display of objects, and the object data associated, can be adapted to simulate an object moved through an angle with respect to the horizontal or vertical plane. It should be appreciated that in addition to shifting a simulated object through an angle, thus altering the tactile feedback presented to the user, it would be possible to simulate moving the object by increasing/decreasing the effort required by the user to move the probe. Thus depending upon the sensed position of the user's finger (9 of FIG. 2) in respect of its position distant from the fulcrum point of the simulated object being moved, and the angle currently enclosed by the simulated object and the simulated base (horizontal) plane the force feedback to the X, Y and Z motors can be adjusted to simulate lifting effort.

Similarly, it is also possible to simulate moving of an object around the horizontal plane. For example an initial "heavier" push is required to overcome the (simulated) frictional contact between an object and the surface upon which it is resting. Further, it is possible to take in to account movement against other objects in a simulated manner. Such features are readily accommodated in creating "worlds" held in the object model database (5 of FIG. 1) together with other features for creating/amending objects to be simulated.

The present exemplary embodiment of this invention is concerned largely with using one particular aspect of haptic perception by users to enable the adaptation of simulated objects in accordance with perception factors applicable to the individual user. One such factor is the Steven's exponent (mentioned hereinabove) which has been determined as a fixed exponent across a range of user perceptions. Thus determining the Steven's exponent for one haptic factor allows adjustment of a range of haptic simulations across a range of haptic features using the same factor to effect adjustment. However, even if it were to be found that certain individual system users have variable factors across a range of features, the invention may be used to determine each such factor for each such feature for subsequent adaptation of output simulations.

Figure 5:
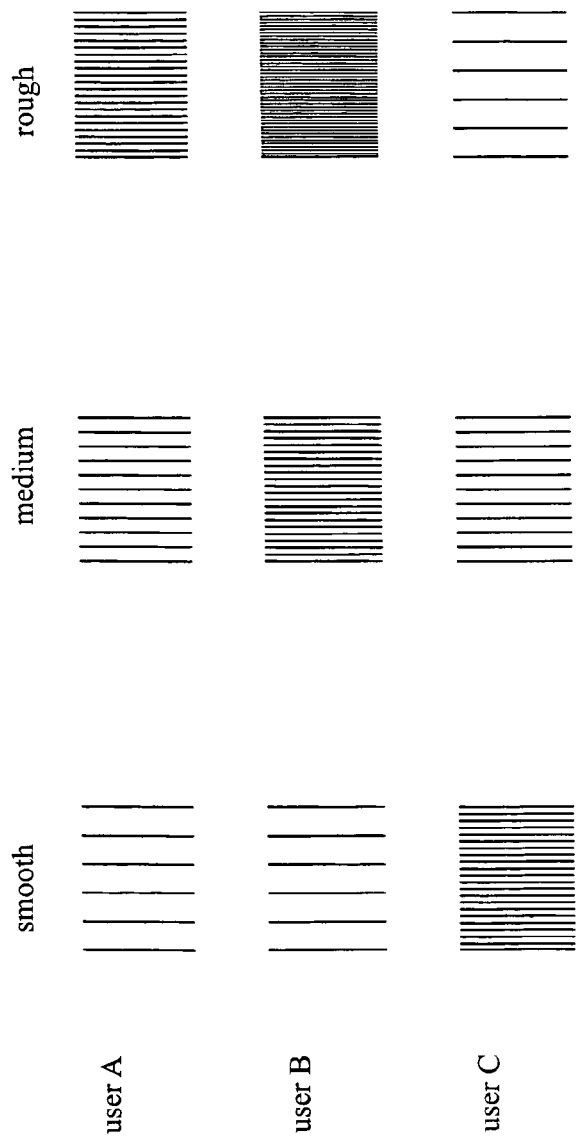
FIG. 5 is a schematic perception diagram.

The present exemplary embodiment of this invention uses one such perception factor to determine the others. Thus in a simple explanatory diagram, shown at FIG. 5 to which reference should now be made, a texture pattern made up of grooves separated by varying amounts is used. In testing of users A, B and C the user's perception of a simulated groove spacing as "smooth", "medium" or "rough" is determined (from user response to simulated outputs). Thus it may be seen that User A and User B each determine that a first pattern is "smooth", which pattern is detected by User C as "rough". In further testing, User A perceives a particular pattern as "medium" while a much more closely spaced arrangement is required by User B, the more closely spaced arrangement here being perceived as "rough" by user A. User B requires a very densely related groove arrangement to perceive "rough". Thus using sets of information a factor related to user perception can be determined. Note that User C has an inverse perception of the smooth to rough transition determined by User A which provides a negative factor or Steven's exponent which negative factor is found to be valid across the same range of factors as the positive (and more positive) factors of Users A and B.

Referring now to FIGS. 6 and 7, simulation of grooves needs to feel as if one is running the finger 9 across the planar surface 10 in which one or more grooves 11 are present. Now if there are a series of grooves (or ridges which essentially is the same effect except as one encounters the first groove or ridge and leaves after the last groove or ridge), in a parallel orientation for example then determination of modifying factors for a user can be determined. Thus as shown in FIG. 8 it is possible to present a sinusoidal shaped groove having a regular pattern which might comprise grooves and ridges below and above the nominal planar surface 10. Thus running the probe across the grooves can be used to obtain a perception of roughness. Changing the width of the cycle (altering the frequency (f) and periodicity (p)) can be used as a testing variant as can be changing the amplitude/height (h).

Referring back to FIG. 7, where the simulated test bed comprises ridges on the nominal simulated planar surface 10 in which it is possible to change the height (h) and width (w) of the simulated ridges, changing the width also affects the spacing between ridges to modify the duty cycle (d) or modifying the frequency (f). It is also possible to change the shape (s) of the ridges so that a cuboid, triangular, truncated cone or sinusoidal ridge arrangement can be provided. These proposed shapes and properties are not intended to be limiting of the possibilities but are simply exemplars of properties of a grid pattern for testing purposes.

It should also be realised that while we refer herein to grooves, ridges and the like it is possible to provide a simulation of many other patterns (or non-repeating patterns if desired) including checkerboard and angled patterns with respect to the normal plane across which the user is searching.

Now refer to FIG. 9 and FIG. 10 (from the Hardwick Dissertation) and note also that density simulation may be provided such that "solid" stimuli (steel, concrete, wood for example) or flexible stimuli (rubber, foam, flexible plastics etc) can be provided. Thus force fields associated with a spherical object are shown in FIG. 9 while force fields associated with a cuboid object are derived in FIG. 10. These fields are capable of simulation within the software environment to provide additional stimulation of the user's tactile determination.

Now when a user enters a simulated world an object such as an armchair (FIG. 11) may be simulated, the probe encountering the various edges and angles which make up the desired shape. Now, in storing the information defining each part of the object it is possible also to add texture to the various parts of the simulated object. Each face of the object may have a differing texture (although all faces of a chair might be similarly covered in practice). Here, the front face (20) of the back has a simulated vertically spaced thread pattern (21) superimposed when simulated while outside of the left arm (22) has an angled parallel thread pattern (23) simulated. Similarly the inner section of the right a 24 carries a regular checkerboard pattern 25 and the footrest 26 has a regular elongate thread pattern superimposed on the top.

Now applying the derived gamma correction factor(s) to the superimposition of thread patterns (for example) ensures that any user presented with the simulated chair object will have the same tactile impression (perception) of the textile surfaces.

Thus within the data model store of FIG. 1 there may be stored data defining the base model parts (the chair) data defining physical characteristics (hardness/flexibility/resilience etc of those parts, for example wooden frame pieces, textile cloth over air space, textile cloth over foam and so on, and data defining a surface texture.

Figure 12:
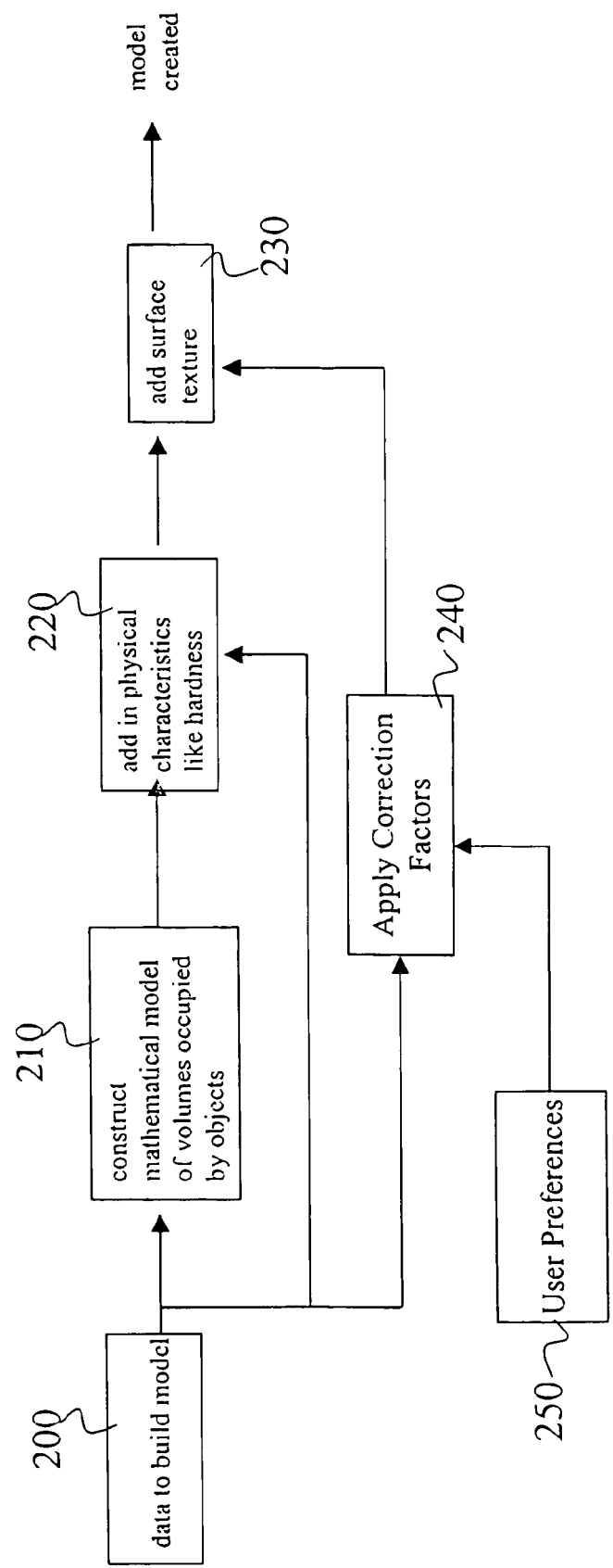
FIG. 12 shows a process for outputting information to a haptic device.

Thus when a simulated object is to be displayed to a particular user and referring now to FIG. 12 and FIG. 1, the processor 1 first obtains the data to build the model to be simulated from the object model data store 5. (Step 200). Users preferences 7 are obtained from the data store 6 (step 250) and are used to determine correction factors (step 240) to be applied to the end object to be simulated. The processor 1 constructs a mathematical model of the object to be displayed (step 210) and adds in the physical characteristics (step 220), also most likely from the object model data store 5. Finally, the surface texture, modified by the user's predetermined gamma correction factor, is added to the mathematical model at step 230. The characteristics of the particular model are now ready for transmission across the network 3 to the haptic output interface 2.

Thus it will be appreciated that by constructing a mathematical model of a textural surface and determining therefrom the factors which affect an individual user's perception it is possible to present a more realistic simulation of objects to be presented. Thus by transmitting a simulated set of grooves to the output device and comparing user reaction to each of a series of test patterns, mathematical correction factors for use in the model are obtained.

In an alternative mode of operation, by providing the user with a swatch of real materials and causing the output device to provide a varying simulation of texture until the user is satisfied that the pattern simulated corresponds with one of the swatch patterns and, if necessary repeating the process correction factors to ensure corresponding user perceptions across network boundaries may be determined.

It will be appreciated that while the present invention has been disclosed with reference to textile materials for example simulation of other textures is encompassed within the resulting modification system. Thus the texture of a wall (concrete/plaster/pebbledash etc) can be simulated as can texture of soil structure and so on. The texture or haptic feel is varied for all objects in accordance with the predetermined user factors, the actual texture being a reflection of the texture desired to be simulated and the user's perception of texture measured against a "norm". It should also be emphasized that texture may be modified across a simulation, not all textures in a simulation being the same but each being modified from its store parameters by the same factor/power as each of the other textures present.

It will also be noted that there may be user perceived differences for a single user when using differing haptic output devices. Thus a respective correction factor may be obtained, determined and stored for each type of haptic output device used by the user and the correction factor to be used in any particular instance will be selected accordingly.

It should also be realised that correction factors for other than texture may be derived for example there may be respective correction factors related to user perception of hardness, resilience, size and the like. Thus the output of the haptic interface can be controlled by applying respective correction factors for each different kind of stimulation/response being presented.

A haptic interface is calibrated by: (a) outputting to a touchable device a signal to cause simulation of a first pattern, (b) determining from user response an index number for the first pattern, (c) outputting to said touchable device at least one further signal causing simulation of at least one further pattern and (d) determining from user response a respective index number for each such further pattern to provide a set of user-specific index numbers, and (e) comparing the set of index numbers with a predetermined set of known index numbers representing a base exponent value to determine a mathematical parameter set defining user-specific correction factors to be applied to haptics signaling outputs. A series of signals may be output defining grooves of varying width and measuring the user response thereto to determine the user specific correction factors. The correction factors determined may define the Stevens exponent for the user. A plurality of correction factors may be derived, a respective correction factor being determined for each of a plurality of user stimulating effects.

Outputting control signals to a haptic output interface may involve: (a) storing data defining signals to be output to cause the haptic output interface to simulate a display, (b) recovering said data in response to user input, (c) modifying the data by application of determined user-specific correction factors and (d) outputting signals determined by the modified data to cause the haptic output interface to provide a user-specific display so that perception of the display between user's having differing correction factors is substantially similar. The user specific correction factor may be selected from a plurality of stored user specific correction factors in dependence upon the haptic output interface currently in use. A plurality of user specific correction factors, each determined in respect of a particular simulated sense, may be used to effect user specific corrections to the output.

Apparatus for determining correction factors to be used in adaptation of haptic output signals may include: processing means and signal output means coupled to a haptic output interface, the processing means storing data defining a multiplicity of display effects, the processing means being arranged to cause output of a series of signals defining known textures to the haptic output interface and to record user's reaction to said outputs, the processor determining from said user's respective reactions to said outputs a correction factor to be used with each of said stored display effects to allow the effects when displayed to be perceived as substantially similar to a known perception of the effects. Respective correction factors for each of a plurality of users may be stored in the processing means whereby on subsequent usage of the apparatus input of a user identity may be used so that a user may return to the apparatus without requiring re-calibration. The determined correction factors or Steven's exponent values determined by a first apparatus may be transmitted to other locations whereby a known gamma correction factor for a particular user may be shared by multiple apparatuses. The gamma correction factor may be used by a central processor connected by way of a connection oriented or connectionless network to a haptic output interface at a remote location. A respective interface may be provided for each of a plurality of users to enable each user to interact simultaneously with the apparatus, the processing applying respective correction factors or Steven's exponent factors to corresponding haptic output signals so that each user has a substantially similar perception of the haptics output. A respective plurality of user correction factors may be stored for each user, each such correction factor being stored in respect of a particular haptic output device, the respective correction factor being selected from the plurality of correction factors in dependence upon the haptic output device(s) connected. A respective correction factor may be determined for each tactile sense to be simulated, one or more correction factors for a particular user being applied to output signaling in dependence upon the simulated senses.

What is claimed is:

1. A method of calibrating a haptic interface comprising:
   outputting to a touchable device a signal to cause simulation of a first pattern,
   determining from user response to said simulation an index number for the first pattern,
   outputting to said touchable device at least one further signal causing simulation of at least one further pattern and determining from user response thereto a respective index number for each such further pattern to provide a set of user-specific index numbers, and
   comparing the set of index numbers with a predetermined set of known index numbers representing a base exponent value to determine a mathematical parameter set defining user-specific correction factors to be applied to haptics signaling outputs, wherein
   the correction factors determined define the Stevens exponent for the user.

2. The method of calibrating a haptic interface as in claim 1 further comprising:
   outputting a series of signals defining grooves of varying width and measuring the user response thereto to determine the user specific correction factors.

3. The method of calibrating a haptic interface as in claim 1 in which a plurality of correction factors are derived, a respective correction factor being determined for each of a plurality of user stimulating effects.

4. A method of outputting control signals to a haptic output interface comprising:
   storing data defining signals to be output to cause the haptic output interface to simulate a display,
   recovering said data in response to user input,
   modifying the data by application of previously determined user-specific correction factors, and
   outputting signals determined by the modified data to cause the haptic output interface to provide a user-specific output so that perception of the output between users having differing correction factors is substantially similar, wherein
   said previously determined user-specific corrections factors are determined by:
   outputting to a touchable device a signal to cause simulation of a first pattern,
   determining from user response to said simulation an index number for the first pattern,
   outputting to said touchable device at least one further signal causing simulation of at least one further pattern and determining from user response thereto a respective index number for each such further pattern to provide a set of user-specific index numbers, and
   comparing the set of index numbers with a predetermined set of known index numbers representing a base exponent value to determine a mathematical parameter set defining user-specific correction factors, wherein
   the correction factors determined define the Stevens exponent for the user.

5. The method of outputting control signals as in claim 4 in which the user specific correction factor is selected from a plurality of stored user specific correction factors in dependence upon the haptic output interface currently in use.

6. The method of outputting control signals as in claim 4 in which:
   a plurality of user specific correction factors, each determined in respect of a particular simulated sense, are used to effect user specific corrections to the output.

7. An apparatus for determining correction factors to be used in adaptation of haptic output signals, the apparatus comprising:
   a processor and a signal output unit coupled to a haptic output interface,
   the processor storing data defining a multiplicity of display effects,
   the processor being arranged to cause output of a series of signals defining known textures to the haptic output interface and to record a user's reaction to said outputs,
   the processor determining from each said user's respective reactions to said outputs a correction factor to be used with each of said stored display effects to allow the effects when displayed to be perceived as substantially similar to a previously known perception of the effects, wherein
   the correction factor defines the Stevens exponent for the user.

8. The apparatus as in claim 7 in which:
   respective correction factors for each of a plurality of users are stored in the processor whereby, on subsequent usage of the apparatus, input of a user identity may be used so that a user may return to use the apparatus without requiring re-calibration.

9. The apparatus as in claim 7 further comprising:
   a transmitter the determined correction factors determined by a first apparatus to other locations whereby a known correction factor for a particular user may be shared by multiple apparatuses.

10. The apparatus as in claim 9 in which:
    the correction factor is used by a central processor connected by way of a connection oriented or connectionless network to a haptic output interface at a remote location.

11. The apparatus as in claim 10 in which:
    a respective interface is provided for each of a plurality of users to enable each user to interact simultaneously with the apparatus,
    the processor applying respective correction factors to corresponding haptic output signals so that each user has a substantially similar perception of the haptics output.

12. The apparatus as in claim 7 in which:
    a respective plurality of user correction factors are stored for each user,
    each such correction factor being stored in respect of a particular haptic output device, the respective correction factor being selected from the plurality of correction factors in dependence upon the haptic output device(s) connected thereto.

13. The apparatus as in claim 7 in which:

a respective correction factor is determined for each tactile sense to be simulated, one or more correction factors for a particular user being applied to output signaling in dependence upon the simulated senses.

* * * * *